United States Patent
Digonnet et al.

(10) Patent No.: US 6,483,628 B1
(45) Date of Patent: Nov. 19, 2002

(54) POLARIZATION AND WAVELENGTH STABLE SUPERFLUORESCENT SOURCES USING FARADAY ROTATOR MIRRORS

(75) Inventors: Michel J. F. Digonnet, Palo Alto, CA (US); Dario G. Falquier, Menlo Park, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/429,044

(22) Filed: Oct. 29, 1999

Related U.S. Application Data

(60) Provisional application No. 60/155,030, filed on Sep. 20, 1999.

(51) Int. Cl.$^7$ .................................................. H01S 3/00
(52) U.S. Cl. ........................ 359/333; 359/341.1; 372/6
(58) Field of Search .............................. 359/333, 341.1; 372/6, 19

(56) References Cited

U.S. PATENT DOCUMENTS

| | | | |
|---|---|---|---|
| 5,185,749 A | | 2/1993 | Kalman et al. |
| 5,355,216 A | | 10/1994 | Kim et al. |
| 5,448,579 A | | 9/1995 | Chang et al. |
| 5,481,391 A | | 1/1996 | Giles |
| 5,822,113 A | | 10/1998 | Delavaux et al. |
| 6,091,743 A | * | 7/2000 | Yang ........................... 372/6 |
| 6,195,200 B1 | * | 2/2001 | DeMarco et al. ........... 359/341 |

OTHER PUBLICATIONS

Emmanuel Desurvire and Jay R. Simpson, *Amplification of Spontaneous Emission in Erbium–Doped Single–Mode Fibers, Journal of Lightwave Technology*, vol. 7, No. 5, May 1989, pp. 835–845.

Kazunori Suzuki, Yasuo Kimura and Masataka Nakazawa, *An 8 mW cw $Er^{3+13}$ Doped Fiber Laser Pumped by 1.46 pm InGaAsP Laser Diodes, Japanese Journal of Applied Physics*, vol. 28, No. 6, Jun. 1989, pp. L1000–L1002.

Paul F. Wysocki, M. J. F. Digonnet, B. Y. Kim, and H. J. Shaw, *Characteristics of Erbium–Doped Superfluorescent Fiber Sources for Interferometric Sensor Applications, Journal of Lightwave Technology*, vol. 12, No. 3, Mar. 1994, pp. 550–567.

Shinji Yamashita, Kazuo Hotate, and Masataka Ito, *Polarization Properties of a Reflective Fiber Amplifier Employing a Circulator and a Faraday Rotator Mirror, Journal of Lightwave Technology*, vol. 14, No. 3, Mar. 1996, pp. 385–1390.

Namkyoo Park and Paul F. Wysocki, 24–Line *Multiwavelength Operation of Erbium–Doped Fiber–Ring Laser, IEEE Photonics Technology Letters*, vol. 8, No. 11, Nov. 1996, pp. 1459–1461.

Jefferson L. Wagener, *Erbium Doped Fiber Sources and Amplifiers for Optical Sensors*, Stanford University Ph.D. Thesis, Mar. 1996, pp. I–150.

(List continued on next page.)

*Primary Examiner*—Mark Hellner
(74) *Attorney, Agent, or Firm*—Knobbe, Martens, Olson & Bear, LLP

(57) ABSTRACT

The wavelength stability of superfluorescent sources is controlled with optical arrangements in which the polarization-dependent gain (PDG) induced by the polarized pump light is reduced. In one apparatus and method, a Faraday rotator mirror is used at the end of the waveguide in the superfluorescent source. In another apparatus and method, the birefringence of the waveguide is exploited in conjunction with a Faraday rotator mirror to further average out the effect of PDG on the mean wavelength difference between the spectral outputs of orthogonal polarization components.

27 Claims, 9 Drawing Sheets

OTHER PUBLICATIONS

Jefferson L. Wagener, Michel J. F. Digonnet, and Herbert J. Shaw, *A High–Stability Fiber Amplifier Source for the Fiber Optic Gyroscope, Journal of Lightwave Technology*, vol. 15, No. 9, Sep. 1997, pp. 1689–1694.

Y. Takushima and K. Kikuchi, *Gain stabilisation of all–optical gain–clamped amplifier by using Faraday rotator mirrors, Electronics Letters*, vol. 34, No. 5, Mar. 1998, pp. 458–460.

Jefferson L. Wagener, Dario G. Falquier, Michel J. F. Digonnet, and Herbert J. Shaw, *A Mueller Matrix Formalism for Modeling Polarization Effects in Erbium–Doped Fiber, Journal of Lightwave Technology*, vol. 16, No. 2, Feb. 1998, pp. 200–206.

* cited by examiner

POLARIZATION AND WAVELENGTH STABLE SUPERFLUORESCENT SOURCES USING FARADAY ROTATOR MIRRORS

The present application claims the benefit of U.S. Provisional Application No. 60/155,030 filed Sep. 20, 1999.

BACKGROUND OF THE INVENTION

1. Field of the Invention

The present invention relates to fiber amplified spontaneous emission (ASE) light sources, and more particularly, to superfluorescent fiber sources that have a mean wavelength that is stable with respect to changes in pump polarization and fiber birefringence.

2. Description of the Related Art

Fiber ASE light sources are well known in the art. ASE sources have been advantageously used to provide wideband (e.g., on the order of 10 to 30 nanometers), spatially coherent light for multiple applications. For example, ASE sources have been used to provide laser light as an input to a fiberoptic gyroscope. For a description of an exemplary superfluorescent fiber source, see an article entitled "Amplification of Spontaneous Emission in Erbium-Doped Single-Mode Fibers" by Emmanuel Desurvire and J. R. Simpson, published by IEEE, in "Journal of Lightwave Technology," Vol. 7, No. 5, May 1989.

An ASE light source typically comprises a length of single-mode fiber, with a portion of its cross-section (typically the core) doped with an ionic, trivalent rare-earth element. For example, neodymium ($Nd^{3+}$) and erbium ($Er^{3+}$) are rare-earth elements that may be used to dope the core of a single-mode fiber so that it acts as a laser medium.

The fiber receives a pump input signal at one end. The pump signal is typically a laser signal having a relatively narrow spectrum centered around a wavelength $\lambda_p$. The ions within the fiber core absorb the input laser radiation at wavelength $\lambda_p$ so that electrons in the ground state of these ions are excited to a higher energy state of the ions. When a sufficient pump power is input into the end of the fiber, a population inversion is created (i.e., more electrons within the ions are in the excited state than are in the lower laser state), and a significant amount of fluorescence is generated along the length of the fiber. As is well known, the fluorescence (i.e., the emission of photons at a different wavelength $\lambda_s$) is due to the spontaneous return of electrons from the excited state to the lower laser state so that a photon at a wavelength $\lambda_s$ is emitted during the transition from the excited state to the ground state. These photons are amplified by the gain as they travel down the fiber, leading to amplified spontaneous emission (ASE). The light which is emitted at the wavelength $\lambda_s$ from the fiber is highly directional light, as in conventional laser light. However, one main characteristic of this emission which makes it different from that of a traditional laser (i.e., one which incorporates an optical resonator) is that the spectral content of the light emitted from the superfluorescent fiber source is generally very broad (typically several tens of nanometers). This principle is well known in laser physics, and has been studied experimentally and theoretically in silica-based fibers doped with erbium, neodymium, or other rare earths, for several years.

Light emitted from ASE fiber sources has multiple applications. For example, in one application, the output of the ASE source is fed into a fiberoptic gyroscope. For reasons that are well understood by those skilled in the art, the fiberoptic gyroscope should be operated with a broadband source which has a highly stable mean wavelength. Of the several types of broadband sources known to exist, superfluorescent fiber sources, in particular, made with erbium-doped fiber, have been thus far the only optical sources which meet the stringent requirements for inertial navigation grade fiberoptic gyroscopes. The broad bandwidth of light produced by erbium-doped fiber sources, together with the low pump power requirements and excellent mean wavelength stability of erbium-doped fiber sources, are the primary reasons for use of such sources with fiberoptic gyroscopes.

In an erbium-doped fiber, the emission of a superfluorescent fiber source is bi-directional. That is, the light which is emitted by the return of electrons to the ground state in the erbium ions is typically emitted out of both ends of the fiber. As described in U.S. Pat. No. 5,185,749, to Kalman, et al., for erbium-doped fibers of sufficient length, the light propagated in the backward direction (i.e., in the direction opposite that in which the pump signal propagates) has a very high efficiency. Thus, it is advantageous to implement erbium-doped sources so that the light emitted from the ASE erbium-doped source is emitted from the pump input end of the fiber (i.e., in the backward propagation direction).

An ASE source is generally implemented in one of two configurations. In a first configuration, called a single-pass ASE source, the superfluorescent source output power is emitted in two directions, one of which is not used. In the second configuration, called a double-pass ASE source, a reflector is placed at one end of the doped fiber to reflect the superfluorescent source signal so that the superfluorescent signal is sent a second time through the fiber. Since the fiber exhibits gain at the superfluorescent signal wavelengths, the ASE signal is further amplified. One advantage of the double-pass configuration is that it produces a stronger signal. A double-pass ASE source configuration also produces output only at one port (i.e., in one direction). A disadvantage of such a configuration is that the feedback optical signal from the gyroscope must be kept very low in order to prevent lasing (e.g., with use of an optical isolator located between the source and the gyroscope).

For fiberoptic gyroscope applications, one critical measure of source performance is the stability of the source mean wavelength (for example, see U.S. Pat. No. 5,355,216 to Kim, et al.). As is well known in the art, stability of the source mean wavelength leads directly to the stability of the gyroscope scale factor. Precise knowledge of the scale factor is critical for an accurate measurement of the rotation rate of the gyroscope. Presently, superfluorescent fiber sources exist which have a mean wavelength stability with respect to pump power, pump wavelength, temperature, and level of optical feedback down to a few parts per million each, assuming reasonable stabilization of system parameters such as pump wavelength, pump power, temperature and optical feedback from the gyroscope. However, an overall stability of better than one part per million in mean wavelength is desirable for some applications, in particular, high-grade fiberoptic gyroscopes.

Polarization effects have recently been shown to play a role in the instability of the mean wavelength of superfluorescent fiber sources (SFS). The polarization dependence of the mean wavelength of an SFS output has been predicted through numerical modeling by J. L. Wagener, et al. [see J. L. Wagener, "Erbium doped fiber sources and amplifiers for optical sensors," Ph.D. thesis, Applied Physics Department, Stanford University (March 1996); and J. L. Wagener, M. J. F. Digonnet, and H. J. Shaw, "A High-Stability Fiber Amplifier Source for the Fiber Optic Gyroscope," *J. Lightwave Technol.* Vol. 15, 1689–1694 (September 1997); and J. L.

Wagener, D. G. Falquier, M. J. F. Digonnet, and H. J. Shaw, "A Mueller Matrix Formalism for Modeling Polarization Effects in Erbium-Doped Fiber," *J. Lightwave Technol.* Vol. 16, 200–206 (February 1998) which are hereby incorporated by reference herein]. These studies have shown that the mean wavelength of the SFS depends slightly on pump polarization. The reason for this can be explained in physical terms as follows. The ions of erbium (or another dopant, such as Nd or another rare earth) in the fiber host experience an intrinsic anisotropy of absorption and emission with respect to polarization. For example, some erbium ions more strongly absorb a given polarization than others, and correspondingly, these erbium ions have a preferred polarization associated with their emission. This effect gives rise to polarization-dependent gain when the erbium-doped fiber is pumped in the usual manner, i.e., by a highly polarized source such as a laser diode. This in turn can result in orthogonal polarization components of the output ASE signal having different mean wavelengths.

SUMMARY OF THE INVENTION

One aspect of the present invention is a superfluorescent source that comprises an optical pump and a laser medium. The laser medium has a dopant therein that produces amplified spontaneous emission (ASE) whose spectrum has a mean wavelength that is different for different polarization components of the ASE. The medium is pumped by pump light from the optical pump. An optical coupler optically couples the pump to the medium. A Faraday rotator mirror reduces the polarization dependence of the output of the source. The mirror reflects ASE emitted from the medium back through the medium. An output port couples ASE from the source. In one embodiment, the source further comprises a depolarizer between the medium and the coupler. In one embodiment, the mirror is coupled to the optical coupler. In one embodiment, the mirror is coupled to the medium. In one embodiment, an optical isolator is positioned at the output port to reduce optical feedback. In one embodiment, a fiber optic gyroscope receives output from the superfluorescent source. In one embodiment, the medium is polarization maintaining and the pump light is directed into the medium in such a way that equal powers of the pump light are launched along birefringence axes of the medium. In one embodiment, the pump light is linearly polarized and is introduced to the medium at 45 degrees with respect to the birefringence axes of the medium. In one embodiment, the dopant is erbium. In one embodiment, the reduction of polarization dependent gain in the medium reduces the mean wavelength difference between the respective spectral outputs of orthogonal polarization components. In one embodiment, the reduction of the polarization dependent gain reduces any dependence of the mean wavelength of any polarization component on birefringence of the medium. In one embodiment, the mirror reflects unabsorbed pump light back through the medium to further reduce the polarization dependence of the output. In one embodiment, the medium includes an optical fiber. In one embodiment, the medium includes an optical waveguide.

DETAILED DESCRIPTION OF THE PREFERRED EMBODIMENT

The present invention is described below in connection with optical waveguides in the form of optical fibers. It should be understood that other types of optical waveguides can be advantageously substituted for the optical fibers in many of the embodiments described herein. The term "solid state" as used herein includes optical waveguides such as optical fibers. The optical output from the embodiments disclosed herein may be advantageously input into a fiber optic gyroscope.

Figure 1:
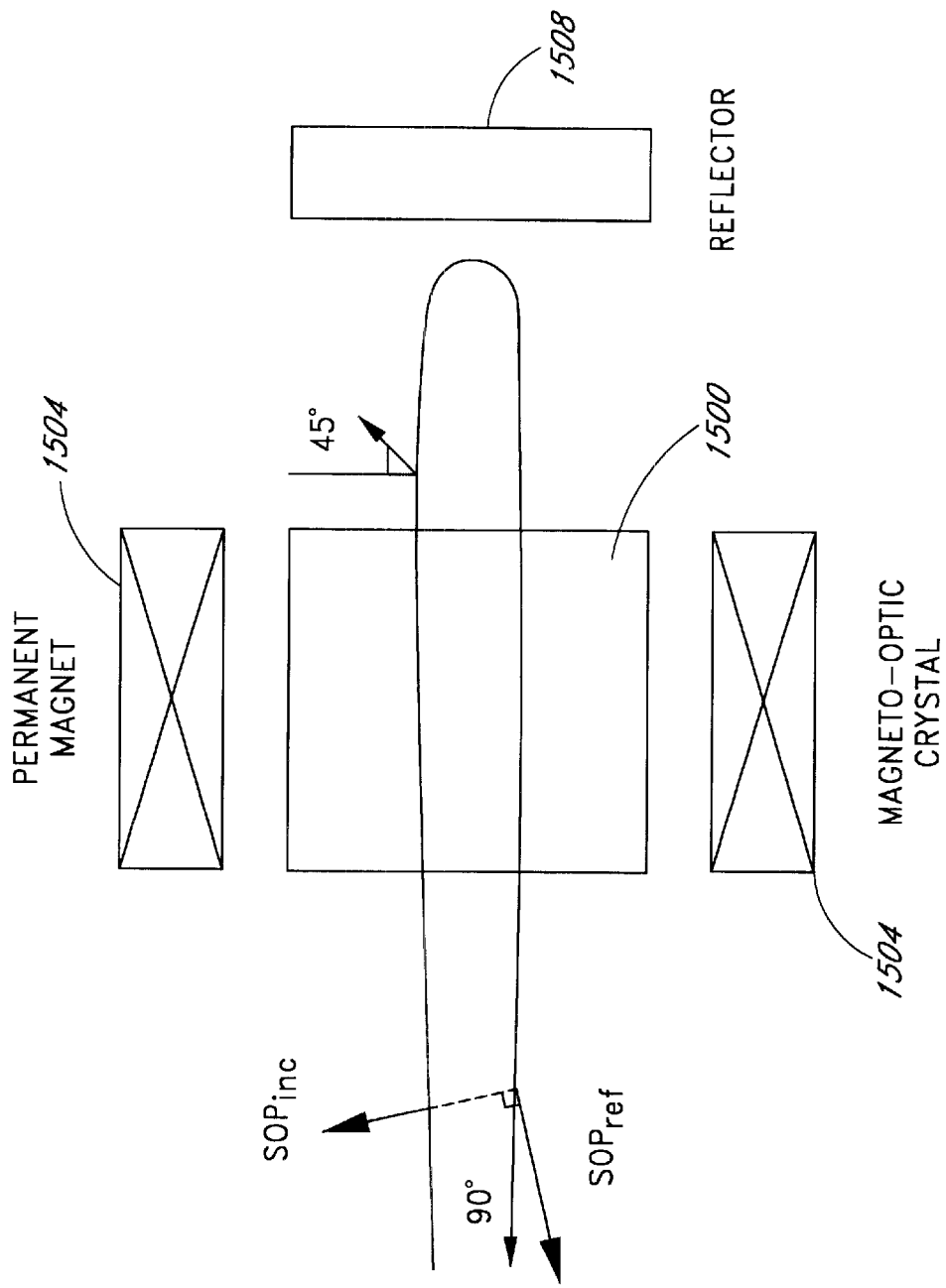
FIG. 1 is a general representation of a Faraday rotator mirror (FRM).

Embodiments are disclosed herein which utilize a Faraday rotator mirror (FRM) for reducing the wavelength dependence of the output of an SFS on (1) the polarization of the pump source at the input to the doped fiber and (2) the birefringence of the fiber. In particular, double-pass SFS embodiments are disclosed in which a Faraday rotator mirror is used rather than a standard reflector (i.e., a non-FRM), thereby resulting in an output mean wavelength that is stable to better than 10 ppm. An FRM placed at the end of a fiber reflects light in such a way that at any point along the fiber, the state of polarization (SOP) of the reflected light is orthogonal to the SOP of the incident light, independent of fiber birefringence or input light SOP. The basic property of the FRM relevant to the embodiments disclosed herein is that if light incident on the face of the FRM has a state of polarization $SOP_{inc}$, then light reflected by the FRM (at that same face) has a state of polarization $SOP_{ref}$ which is precisely orthogonal to $SOP_{inc}$. (See, for example, S. Yamashita, K. Hotate, and M. Ito, "Polarization properties of a reflective fiber amplifier employing a circulator and a Faraday rotator mirror," J. Lightwave Technol. vol. 14, pp. 385–390, March 1996.) For example, if $SOP_{inc}$ is vertically polarized then $SOP_{ref}$ is horizontally polarized; if $SOP_{inc}$ has a left circular state of polarization, then $SOP_{ref}$ has a right circular state of polarization; and so on. To produce this effect, an FRM typically utilizes a non-reciprocal element called a magneto-optic crystal, such as bismuth iron garnet, followed by a standard reflector, as illustrated in FIG. 1. The magneto-optic crystal 1500 is placed in a magnetic field provided by a permanent magnet 1504 placed in the immediate vicinity of the crystal 1500. By virtue of the well-understood magneto-optic effect, when light travels in one direction through a magneto-optic crystal immersed in a magnetic field, the SOP of the light is rotated by some angle +ψ, which depends on the length of the crystal 1500 (as well as the wavelength of the light and the magnitude of the magnetic field). On the other hand, light traveling in the opposite direction sees its SOP rotated by the same angle +ψ. In an FRM, the angle ψ is selected to be 45 degrees. For example, if the SOP of the incident light is linear and vertical, after passing through the crystal 1500 (left to right in FIG. 1) it is linear at +45 degrees. A mirror 1508 reflects the light without altering this SOP. When the reflected light, now polarized at +45 degrees, goes through the crystal 1500 a second time (this time from right to left), the crystal 1500 rotates its polarization again by +45 degrees. Thus at the output (left face) of the crystal 1500, the light is polarized horizontally, i.e., it is polarized at 90 degrees with respect to the incident light. This analysis holds for any polarization: For any arbitrary incident state of polarization, the reflected state of polarization is orthogonal to it.

Faraday rotator mirrors are available commercially from several vendors, e.g., ETEK, a fiberoptic company based in Santa Clara, Calif. In the present invention, the FRM is advantageously optically coupled to a single-mode fiber. The optical element that couples the FRM to the fiber is preferably some form of optical lens. Commercial models of FRMs that may be used with the embodiments herein include fiber-pigtailed FRMs, in which an optical lens and a fiber are included and optically aligned. This permits light to be launched directly by the user into the fiber, with the light being returned by the same fiber. The returned light can then be spliced to the rest of the user's fiber circuit.

Figure 2A:
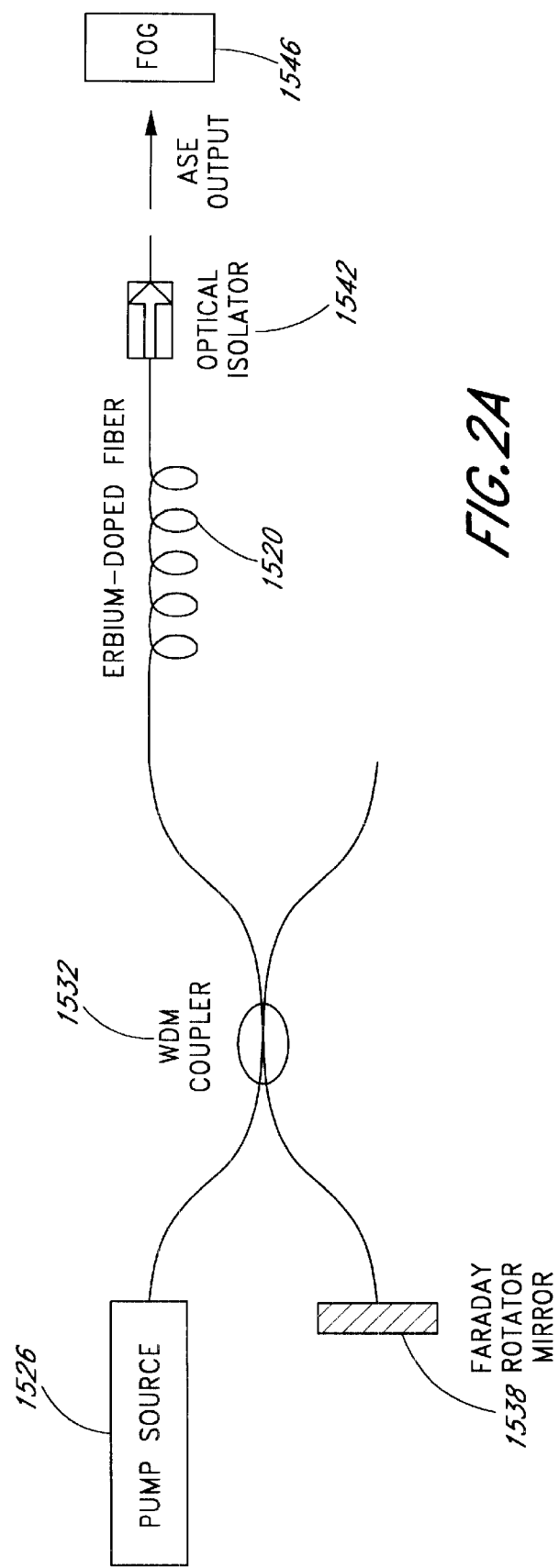
FIG. 2A is a forward pumped superfluorescent fiber source (SFS) in which the wavelength dependence of the output with respect to changes in the polarization of the pump source is reduced.
Figure 2B:
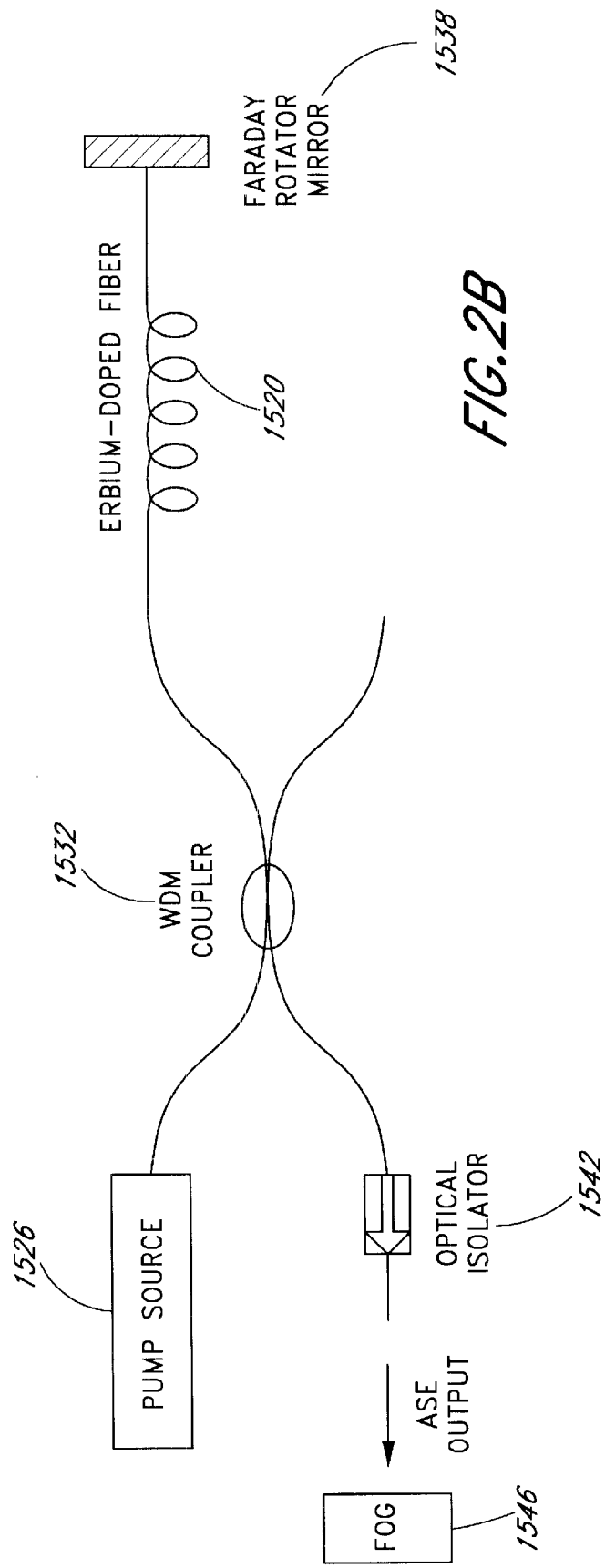
FIG. 2B is a backward pumped superfluorescent fiber source (SFS) in which the wavelength dependence of the output with respect to changes in the polarization of the pump source is reduced.

Two embodiments incorporating an FRM into an SFS configuration are shown in FIGS. 2A and 2B. FIG. 2A shows a forward double-pass configuration that includes a length of erbium-doped fiber (EDF) 1520 pumped by a light source 1526 (e.g., a laser diode) which are coupled together with a wavelength-division multiplexing (WDM) coupler 1532. An FRM 1538 is coupled to the WDM coupler 1532 so that the FRM and EDF 1520 are on opposite sides of the coupler 1532, as illustrated in FIG. 2A. An optical isolator 1542 is placed at the output end of the EDF 1520 to reduce optical feedback into the SFS from that end. In a conventional forward double-pass SFS (see, for example, P. F. Wysocki, M. J. F. Digonnet, B. Y. Kim, and H. J. Shaw, "Characteristics of Erbium-Doped Superfluorescent Fiber Sources for Interferometric Sensor Applications," IEEE J. Lightwave Technol. 12, pp. 550–567, March 1994), a standard reflector is used rather than an FRM. The ASE output may be advantageously inputted into a fiber optic gyroscope (FOG) 1546.

In a double-pass SFS such as that shown in FIG. 2A, the light that is coupled out of the SFS includes two different superfluorescent contributions resulting from spontaneous and stimulated emission of the inverted erbium ions. The first is the forward superfluorescence, i.e., the fluorescence signal generated in the direction of travel of the pump light, or left to right in FIG. 2A. This first contribution travels only once through the EDF 1520. The second contribution is the backward superfluorescence, i.e., the signal generated in the direction opposite the propagation of the pump light, or right to left in FIG. 2A, which is then reflected in the forward direction by the reflector 1538 and amplified by the EDF 1520 before exiting the SFS. This second contribution has traveled through and been amplified by the EDF 1520 twice, and thus typically carries far more power than the forward component. Consequently, the output of the double-pass SFS shown in FIG. 2A is made up almost entirely of light that has traveled through the fiber 1520 twice.

A backward double-pass SFS configuration is shown in FIG. 2B, in which the positions of the FRM 1538 and the optical isolator 1542 have been interchanged with respect to their positions in FIG. 2A. Again, the ASE output may be advantageously inputted into a fiber optic gyroscope (FOG) 1546. In the embodiment of FIG. 2B, if the FRM 1538 is properly designed, pump light that is not absorbed by the EDF 1520 as it travels towards the FRM 1538 is reflected by the FRM 1538 and directed back through the EDF 1520, where the pump light may be absorbed to produce higher population inversion and gain than would be possible in the absence of a reflector 1538. Because unabsorbed pump light is recycled in the embodiment of FIG. 2B, it is possible to obtain a higher SFS output with this configuration than in the embodiment of FIG. 2A, assuming the same pump power is used. In both embodiments, the ASE signal is recycled, so that it is possible to obtain a given SFS output power using a shorter length of EDF 1520 than it would be in a single-pass SFS configuration. Thus, the embodiments of FIGS. 2A and 2B are both attractive over single-pass configurations from a cost and a compactness standpoint.

One aspect of the embodiment of FIG. 2A is that ASE traveling from right to left is precisely orthogonal to ASE traveling in the other direction that has been reflected by the FRM 1538. This holds true at all points in the fiber circuit. For example, the effect of the FRM 1538 is such that at any point along the EDF 1520, the SOP of the backward superfluorescence light (incident on the FRM 1538 and traveling from right to left) is orthogonal to the SOP of the reflected fluorescence light (reflected from the FRM 1538 and traveling from left to right). This is so even if the FRM 1538 is pigtailed to a standard, low birefringence fiber (such as the input fiber of the WDM coupler 1532), along which the birefringence may vary somewhat due to environmental perturbations such as temperature and pressure variations. The considerations of this paragraph also apply to the embodiment of FIG. 2B.

This property results in an output from the SFS with a mean wavelength that is relatively stable with respect to variations in the polarization of the pump light, as illustrated by the following physical considerations. With respect to FIG. 2A, consider without loss of generality the simple hypothetical case of light from a pump source 1526 that is vertically polarized along the entire length of the EDF 1520. The backward superfluorescence light of the EDF 1520 has two polarization components, referred to herein as A and B. Assuming negligible birefringence, component A is vertically polarized as it travels through the EDF 1520 from right to left, i.e., it is parallel to the pump polarization and experiences a gain $g_{par}$. Component B, on the other hand, is horizontally polarized through the EDF 1520 (also from right to left), i.e., perpendicular to the pump polarization. Consequently, due to polarization dependent gain, component B experiences a different (slightly lower) gain $g_{perp}$. After being reflected by the FRM 1538, the polarization of component A is rotated +90 degrees, i.e., it becomes horizontally polarized, while the polarization of component B is also rotated +90 degrees and becomes vertically polarized. As component A travels a second time through the EDF 1520, its polarization is now perpendicular to the pump polarization, and it experiences a gain $g_{perp}$. Since it had already experienced a gain $g_{par}$ during its first pass through the EDF 1520, the total gain it has experienced by the end of its second pass is $g_A=g_{par}+g_{perp}$. Similarly, as component B travels a second time through the EDF 1520, its polarization is now parallel to the pump polarization, and it experiences a gain $g_{par}$. Since it had already experienced a gain $g_{perp}$ during its first pass through the EDF 1520, the total gain that component B has experienced by the end of its second pass is $g_B=g_{perp}+g_{par}$, which is equal to gA. The net result is that both polarization components of the superfluorescence light have experienced the same gain, and consequently, they exhibit the same spectrum. This line of reasoning applies to any arbitrary pump polarization. Thus, in FIG. 2A, the mean wavelength of that light exiting the SFS which has undergone reflection at the FRM 1538 (the double pass contribution to the output) is relatively insensitive to the polarization of the pump light. However, the light exiting the SFS in FIG. 2A also includes ASE that has made just a single pass through the EDF 1520, namely, from left to right. The mean wavelength of this light will experience the usual dependence on pump light polarization, but the intensity of this single pass component of the SFS output is much lower than that of the light which makes two passes through the EDF 1520 (which is amplified twice). The net effect is that the mean wavelength of the overall output from the embodiment of FIG. 2A is relatively stable with respect to pump polarization. Simulations for the ASE output from this embodiment which are consistent with these conclusions are presented below.

The spectral output from the embodiment of FIG. 2B is more stable than that of FIG. 2A for at least two reasons. First, in FIG. 2B, the pump light from the pump source 1526 undergoes reflection at the FRM 1538 so that the reflected pump light has a polarization that is precisely orthogonal to that of the forward (incident) propagating pump light at every point along the EDF 1520—the EDF is effectively pumped bidirectionally, with counterpropagating signals having orthogonal polarization states. Consequently, the mean wavelength of the double-pass component is even less sensitive to pump polarization variations. Second, the embodiment of FIG. 2B is configured so that the single-pass ASE contribution to the SFS output is generated by the bidirectionally pumped EDF. Thus, the mean wavelength of this single-pass component is less sensitive to pump polarization variations.

Nevertheless, the output from the SFS of FIG. 2B can be expected to display some residual mean wavelength dependence on pump polarization for the following reasons. The pump power traveling in the forward direction is greater than that traveling in the backward direction (since some of the forward traveling pump light is absorbed on its first pass through the EDF), although this difference is significantly diminished in the limit that the pump power is extremely high and the EDF 1520 is bleached. Also, the gain in an EDF is slightly lower in the forward direction (co-traveling with the pump) than in the backward direction (counterpropagating with the pump). In general, these two effects will only partially compensate each other.

In general, the state of polarization (SOP) of the pump light can be expected to vary periodically along the EDF 1520, with a period $L_b$ that depends on the birefringence of the fiber. In typical low-birefringence fibers, this period $L_b$ is in the range of a few tens of cm or more. Likewise, the SOP of every frequency component of the ASE signal traveling through the EDF also varies periodically along the EDF, with a period $L_b'$ that is different from $L_b$. This difference arises primarily from the fact that the pump and the ASE signal have different wavelengths. Thus, at periodic locations along the EDF 1520, the pump light and a given frequency component of the ASE signal have parallel (linear or circular) polarizations, while at other periodic locations along the EDF, the pump and this given frequency component of the ASE signal have orthogonal (linear or circular) polarizations. If the distance between these locations of mutually parallel and orthogonal polarizations is short enough, e.g., much shorter than the pump absorption length of the EDF 1520, this given ASE frequency component will experience gain due to pump light polarized alternately parallel and orthogonal to the polarization of this given frequency component. Consequently, the variations in gain arising from variations in the polarization of the pump light along the EDF 1520 are averaged out. In short, every ASE signal frequency component experiences less polarization dependent gain (PDG) than it would if the pump light and the ASE signal remained parallel along the entire length of the EDF 1520. The result is that the presence of birefringence in an EDF, which is common, reduces PDG. Consequently, birefringence in the EDF 1520 will reduce the difference between the SFS spectrum mean wavelengths of orthogonal polarizations (denoted herein as Δ) to a value lower than would be the case if the ASE and pump light had fixed relative polarizations throughout the EDF. A corollary of this fact is that pump light that has a linear polarization along the entire length of the EDF 1520 is unfavorable for reducing polarization-dependent gain and the quantity Δ (which is a measure of the stability of the mean wavelength of the SFS spectral output).

Figure 3:
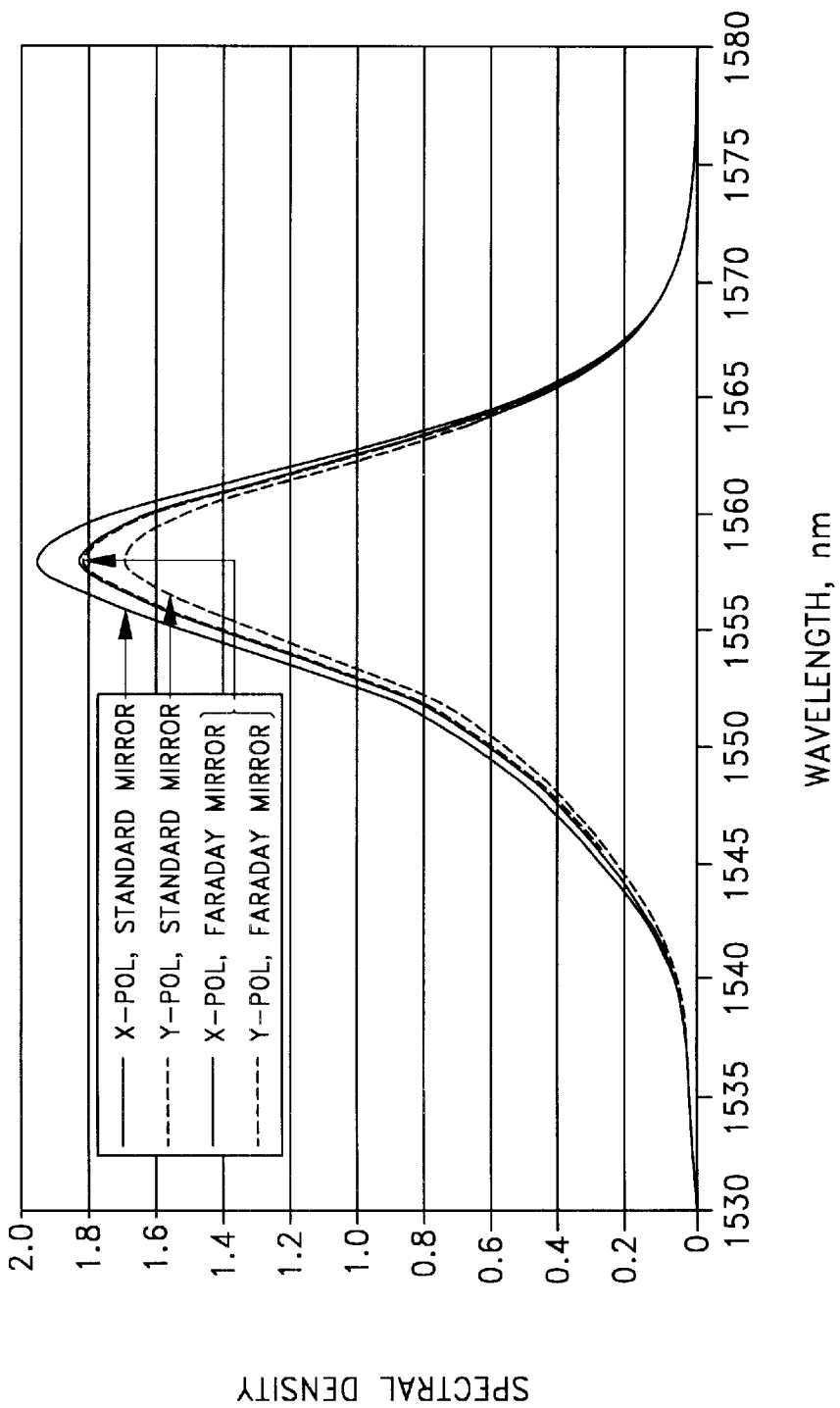
FIG. 3 shows simulated output spectra for orthogonal ASE polarizations from forward double pass erbium-doped SFS sources, in which a reflector within the SFS source is chosen to be either an FRM or a standard (non-FRM) mirror.

The output spectrum of an Er-doped SFS was modeled with a computer code that accounts for the evolution of both the pump and the superfluorescence SOPs along the EDF. [See Wagener et al, supra.] FIG. 3 shows optical spectra for the configuration of FIG. 2A, as well as for a configuration analogous to FIG. 2A in which the FRM 1538 has been replaced with a standard mirror. For these calculations, the pump power was chosen to be 30 mW (at 1480 nm), and the fiber length was 6 meters. The fiber parameters were taken to be standard EDF parameters, namely, the peak small-signal absorption of the fiber at 1530 nm was 23.7 dB/m, and the fiber saturation parameter, defined as the product of the pump mode effective area by the concentration of the erbium ions, divided by the excited-state lifetime of the erbium ions, was $1.3 \times 10^{+16}$/m/s. The eccentricity coefficient of the erbium ions was taken to be 0.6. This coefficient is defined and discussed in J. L. Wagener, "Erbium doped fiber sources and amplifiers for optical sensors," Ph.D. thesis, Applied Physics Department, Stanford University (March 1996); and J. L. Wagener, D. G. Falquier, M. J. F. Digonnet, and H. J. Shaw, "A Mueller Matrix Formalism for Modeling Polarization Effects in Erbium-Doped Fiber," J. Lightwave Technol. 16, 200–206 (February 1998). The polarization of the pump in the simulations presented herein was taken to be linear along the entire length of the EDF 1520 (defined as the "x" polarization). The highest curve in FIG. 3 is the output spectrum for the ASE polarized along the polarization of the pump (x-polarized), using a standard mirror instead of an FRM. The lowest spectrum is the output spectrum for the ASE polarized perpendicular to the pump's polarization (y-polarized), also using a standard mirror. As expected, the two spectra differ markedly. The calculated difference between the mean wavelengths of these two spectra (Δ) is about 100 parts per million (ppm).

Analogous calculations for the embodiment of FIG. 2A, which uses an FRM, however, indicate that the ASE spectra for the x and y polarizations are very nearly the same (see FIG. 3). The α for these two spectra is only about 15 ppm, which is consistent with the effect predicted above: The FRM 1538 acts to equalize the ASE spectra of orthogonal polarizations. Note, however, as discussed above, that the linear pump polarization assumed in these calculations is the least desirable pump polarization configuration, and in any practical working SFS, the pump light will not remain linearly polarized along the length of the EDF 1520. Thus, in practice, Δ will be lower (i.e., better) than indicated by the simulations, for both the FRM embodiment of FIG. 2A and its standard reflector counterpart.

Figure 4:
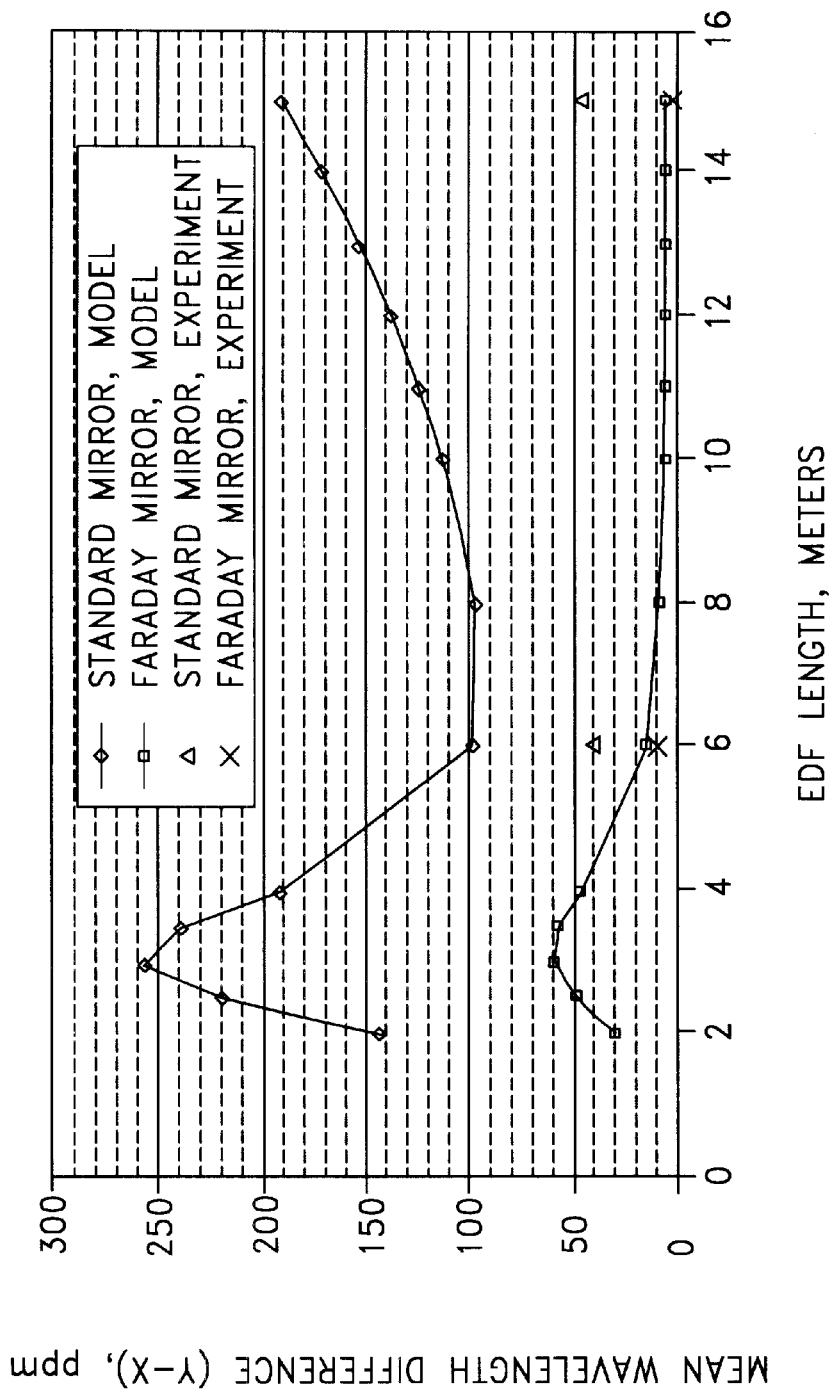
FIG. 4 presents calculations and experimental data points of the wavelength stability, as a function of erbium-doped fiber length, of a double pass SFS source in which either an FRM or a standard mirror is used at the end of the fiber.

FIG. 4 shows the predicted dependence of Δ on the length of the EDF 1520 using the computer code and assumptions discussed above, for the forward double-pass SFS of FIG. 2A. The top curve in FIG. 4 represents calculations for an embodiment that uses a standard mirror instead of an FRM, and the lower curve represents calculations for an embodiment that uses an FRM. For all the EDF lengths, the FRM reduces α by a significant factor that generally increases with increasing fiber length. For a 10-m length of EDF, for example, this factor is approximately 18. It should be noted that in practical working embodiments, the maximum length of the fiber may be limited by other considerations.

Figure 5:
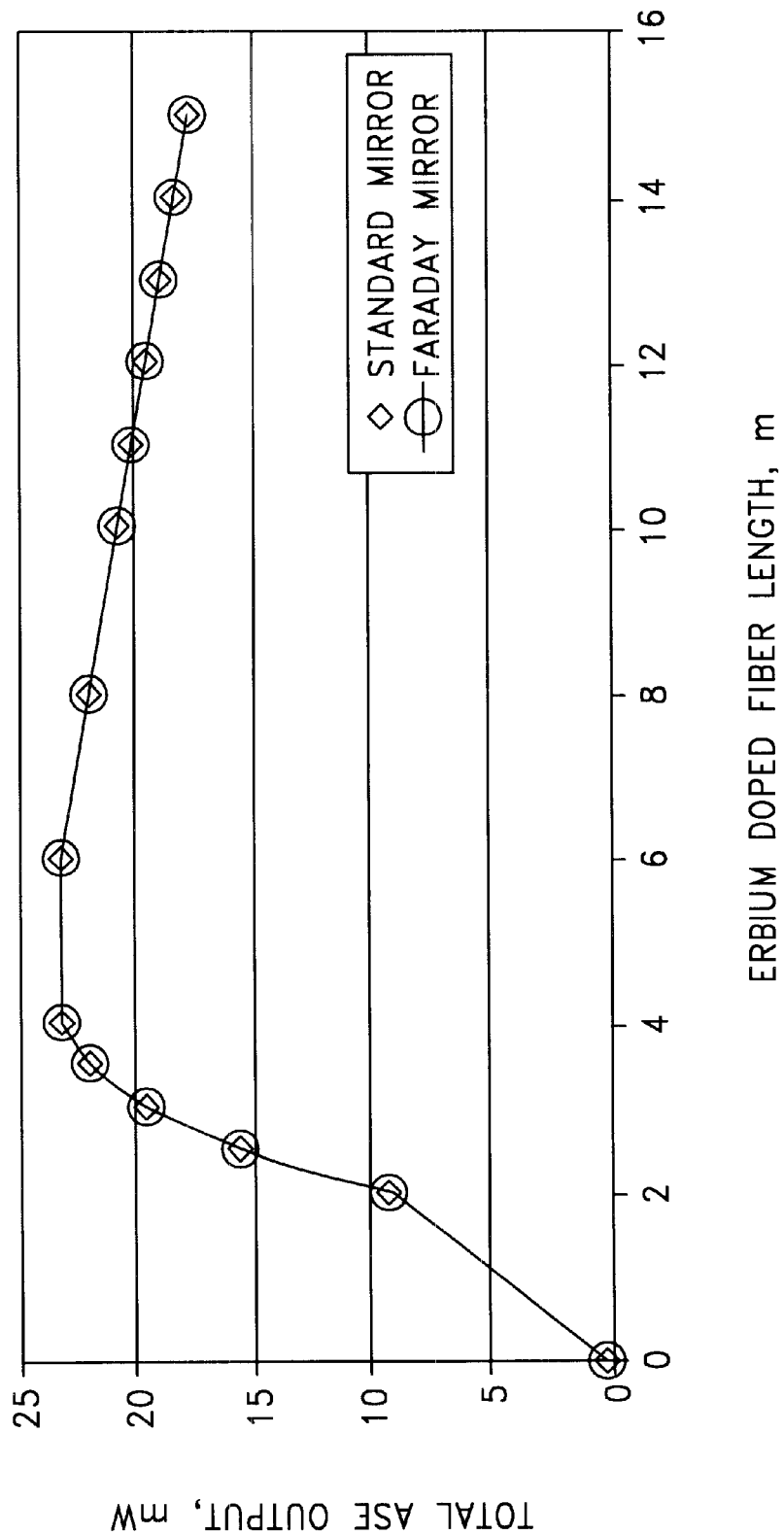
FIG. 5 presents a theoretical prediction of the total amplified spontaneous emission (ASE) power from a forward double pass erbium-doped SFS source as a function of the length of the fiber.

The length of the EDF also affects the power emitted by the SFS, as shown in FIG. 5, which plots simulated ASE power emitted by the SFS versus the length of the EDF. As is well known in the art, there is an EDF length that maximizes the output power. For the particular fiber and pump power modeled here (the same assumptions discussed above were used to generate FIG. 5), the optimum EDF length is in the range of 4 to 6 m. FIG. 5 also shows that the output power is the same whether an FRM or a standard mirror is used in the SFS. Thus, one way of implementing the embodiments herein is to select that EDF length which maximizes the output power of the SFS for a given pump power. When an FRM is used, this results in a good reduction in Δ over that which can be achieved using a standard mirror (a factor of 6.5 in this example see FIG. 4). Another option is to select an EDF length longer than this optimum value, which will yield a slightly lower output power but a smaller Δ (i.e., greater mean wavelength stability with respect to pump polarization). For example, with an EDF length of 10 m, the output power is reduced by only about 10% (see FIG. 5), while the polarization dependence factor decreases by a factor of about 2.8. (see FIG. 4). In practice, the requirements of a particular application may dictate the optimum fiber length.

Figure 6:
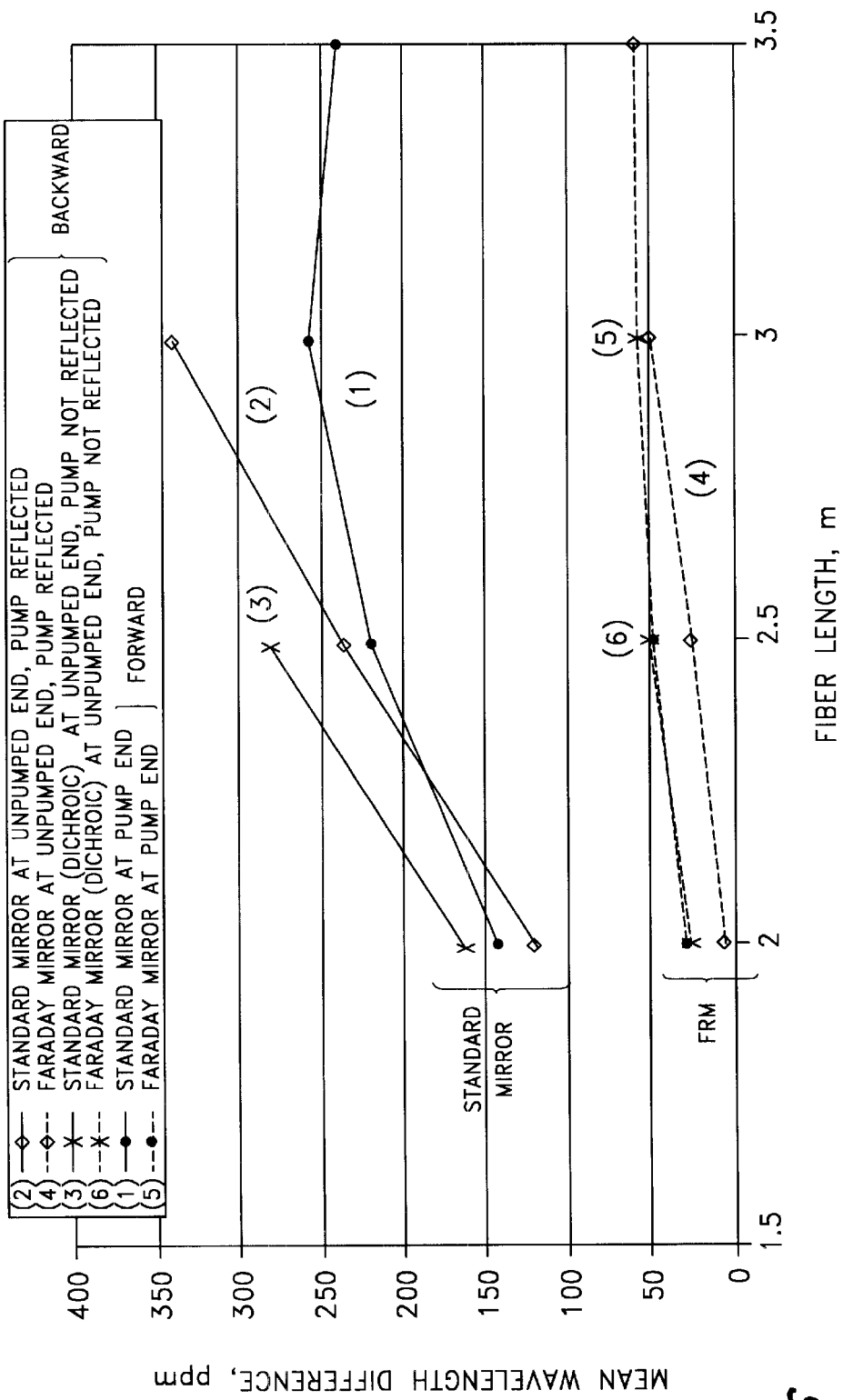
FIG. 6 presents a theoretical prediction of the difference in the mean wavelengths of orthogonal ASE polarizations of the output from various double pass erbium-doped SFS sources.

Simulation results are plotted in FIG. 6 using the aforementioned code over a limited range of fiber lengths for which the code converges when simulating the backward double-pass configuration. For the particular fiber modeled (the fiber parameters were the same as before), the maximum length for which the code converged was about 3 m. Curve (5) models the SFS output from the forward configuration shown in FIG. 2A, in which only the ASE is reflected through the EDF 1520 by the FRM 1538 (this curve is a portion of the bottom curve of FIG. 4). Curve (1) models the SFS output from a forward configuration analogous to FIG. 2A in which the FRM 1538 has been replaced by a standard reflector (i.e., a non-FRM) which again reflects only the ASE (this curve is a portion of the upper curve of FIG. 4). Curve (4) models the SFS output from the backward configuration of FIG. 2B, in which both ASE and the pump light are reflected back through the EDF 1520. Curve (6) models the SFS output from a backward configuration like FIG. 2B except that a dichroic FRM is used so that no pump light is reflected back through the EDF 1520, but ASE is reflected back through the EDF 1520. Curve (2) models the SFS output from a backward configuration analogous to FIG. 2B in which the FRM 1538 has been replaced by a standard reflector that reflects both ASE and the pump light through the EDF 1520. Curve (3) models SFS output from a backward SFS configuration analogous to FIG. 2B in which the FRM 1538 has been replaced by a standard (non-FRM), dichroic reflector which reflects ASE back through the EDF 1520 but does not reflect pump light back through the EDF 1520.

As expected, Δ is generally worse for curve (2) than for curve (1), because with a standard reflector, the reflected pump light has the same polarization as the incident pump light, and thus the reflected pump light contributes to higher PDG, and thus to higher Δ. (The code assumes no birefringence in the fiber, so that the polarization of the pump light is linear along the length of the EDF.) When the pump light is not reflected back through the EDF 1520 (see curve (3)), it is expected that A is less than that of curve (2), but for reasons that are still under investigation, the code predicts the larger Δ shown by curve (3).

The backward SFS configuration utilizing an FRM 1538 that reflects pump light back through the EDF 1520 (curve (4)) yields substantially better results (lower Δ) than the forward SFS configuration utilizing an FRM 1538 (curve (5)), as expected. When a dichroic FRM is used in the backward configuration so that the pump light is not reflected (curve (6)), the backward SFS exhibits about the same Δ as the forward configuration shown in curve (5). This is expected, since the basic improvement of a backward configuration over a forward configuration is that the pump light may be reflected. Removing the pump reflection essentially returns A to the value it has in the forward configuration.

FIG. 6 also shows that the use of an FRM reduces Δ substantially compared to a source with a standard mirror, by a factor of about 7 for a 3-meter fiber (backward configuration), and by a factor of about 17 for a 2-meter fiber to about 7 ppm (curve (4) compared to curve (2)).

Figure 7:
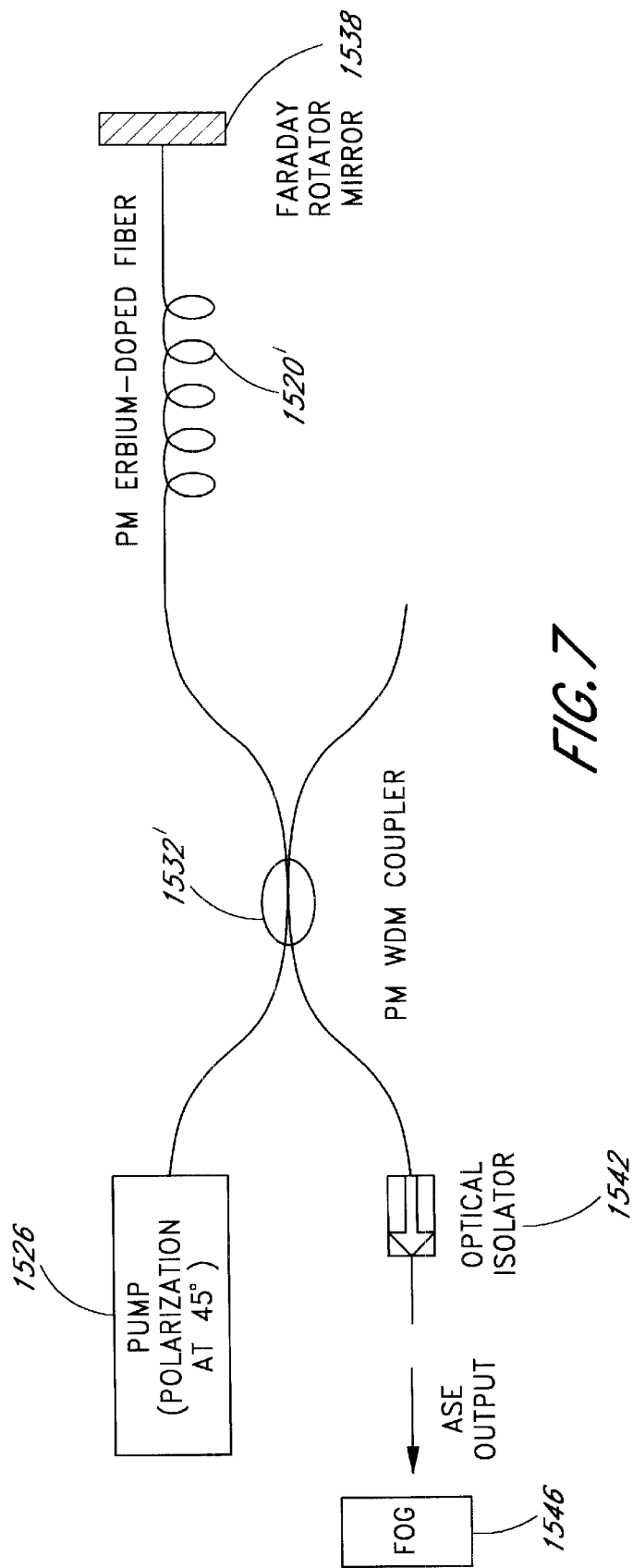
FIG. 7 is a double pass SFS source in which birefringence effects are used to help control the wavelength stability of the spectral output by use of a polarization maintaining (PM) erbium doped fiber (EDF).

FIG. 7 shows another SFS embodiment which utilizes an FRM 1538 for reducing the wavelength dependence of the output on the polarization of the pump source 1526. Unlike the embodiments of FIGS. 2A and 2B, however, this embodiment uses a polarization-maintaining erbium-doped fiber (PM EDF) 1520' and a polarization-maintaining WDM coupler 1532'. Once again, an optical isolator 1542 is used at the output end. In this embodiment, the pump light from the pump source 1526 is coupled into the PM WDM coupler 1532' so that the polarization of the pump light incident on the PM EDF carries equal power on each of the two birefringence axes of the EDF 1520'. This can be accomplished, for example, by attaching (e.g., by splicing or otherwise) the output fiber of the PM WDM coupler 1532' to the PM EDF 1520' so that their birefringence axes are at 45° to each other, in which case the pump, which is linearly polarized, must be launched with its polarization aligned with one of the birefringence axes of the PM WDM coupler 1532'. Another method is to attach (again by splicing or otherwise) the output fiber of the PM WDM coupler 1532' to the PM EDM 1520' so that their birefringence axes are aligned, in which case the pump polarization must be launched at 45° to the birefringence axes of the PM WDM coupler 1532'. The pump polarization at the input to the EDF 1520' is not necessarily linear, but may be any one of a number of polarizations (e.g., circular) that will launch equal powers into the two birefringence axes.

As discussed above, the SOP of both the pump light and the various frequency components of the ASE signal vary periodically along the length of the EDF 1520' but with different periods, which reduces PDG. Therefore, the SFS of FIG. 7 reduces PDG in more than one way. The first way is through the presence of an FRM. The second way is through the presence of birefringence in the EDF. Since a PM fiber has a much shorter beat length, and thus a shorter difference $L_b - L_b'$, than a standard non-PM fiber, the averaging effect of the polarization is stronger with the PM configuration of FIG. 7. Consequently, in the embodiment of FIG. 7, $\Delta$ is reduced even further compared to the embodiments of FIGS. 2A and 2B. An embodiment similar to FIG. 7 but with the FRM on the other side of the coupler 1532' yields similar benefits.

Figure 8:
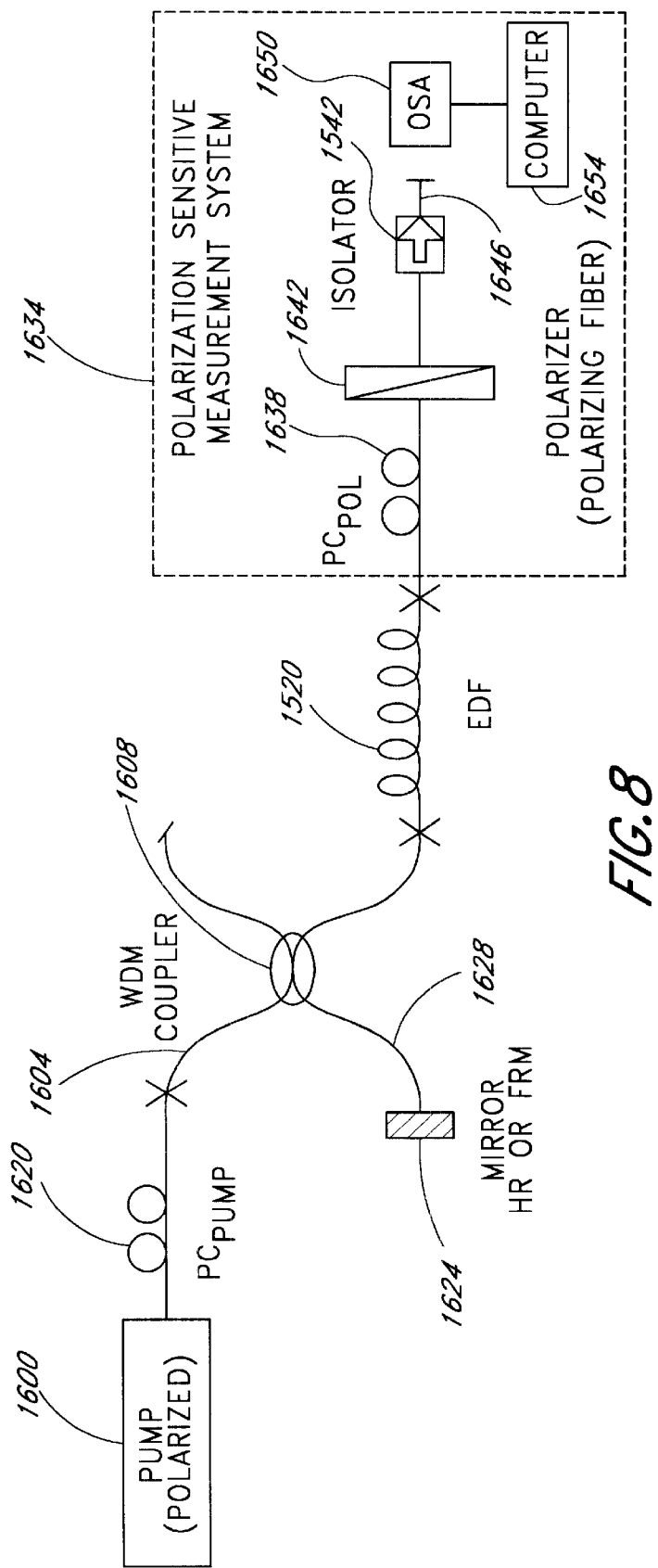
FIG. 8 is an experimental setup for investigating the wavelength stability of the spectral output from a forward double-pass erbium-doped SFS source.

A prototype of an SFS embodiment which uses an FRM is shown in FIG. 8. Pump light at 1480 nm from a fiber-pigtailed semiconductor laser 1600 was coupled to the EDF 1520 through a top left port 1604 of a WDM fiber coupler 1608. A first polarization controller $PC_{pump}$ 1620 was positioned between the pump source 1600 and the WDM coupler 1608 to apply variations in the polarization of the pump light that was launched into the fiber 1520. A reflector 1624 on the pump end of the SFS had high reflectivity at the ASE wavelengths and was either a standard (non-FRM) high reflector (HR) or a Faraday rotator mirror. The reflector 1624 was attached to the bottom left port 1628 of the WDM coupler 1608, as indicated in FIG. 8. The pump power and pump wavelengths were kept constant during all measurements.

The WDM coupler 1608 was designed to couple most of the pump light into the EDF 1520 while transmitting most of the ASE from the EDF 1520 to the reflector 1624, making this embodiment a double-pass SFS. The ASE output from the EDF 1520 was analyzed with a polarization-sensitive measurement system 1634, which included a second polarization controller $PC_{pol}$ 1638, followed by a polarizing fiber 1642 (which acted as a polarizer), and an optical isolator 1542. The ASE light exiting the optical isolator 1542 passed through an optical fiber 1646 and was coupled into an optical spectrum analyzer (OSA) 1650 for acquiring the optical spectrum of the ASE output. A computer 1654 recorded this spectrum and computed its mean wavelength. These acquisition and computation operations were performed approximately once every 5–10 seconds.

The dependence of the mean wavelength of the ASE output with respect to polarization was investigated by adjusting the two polarization controllers 1620, 1638, one at a time, over all possible polarization states. The polarization controller $PC_{pol}$ 1638 permitted variation in that component of the ASE output that was transmitted by the polarizer 1642, so that the OSA 1650 could analyze the mean wavelength of each of the two orthogonal linear components of the ASE output. Similarly, the role of polarization controller $PC_{pump}$ 1620 was to vary the polarization of the pump light launched into the EDF 1520, and thus to evaluate the effect of pump polarization drifts on the mean wavelength of any given linear polarization component of the SFS output.

The first series of tests was run with an EDF 1520 having a length of 6 meters. The results of these measurements are summarized below in TABLE 1. When a standard HR was used as the reflector 1624, the peak-to-peak mean-wavelength variation measured when the $PC_{pump}$ 1620 was adjusted over all possible polarization states was 16 ppm, while when the $PC_{pol}$ 1638 was adjusted the variation was 40 ppm. In other words, for a given position of the $PC_{pump}$ 1620 the output of the double-pass SFS was slightly polarized, with a $\Delta$ of 40 ppm. The mean wavelength of a given polarization component of the SFS output was also susceptible to the pump polarization and varied by 16 ppm. When an FRM was used as the reflector 1624, both the 40-ppm figure and the 16-ppm figure were reduced to 10 ppm (see TABLE 1), demonstrating the effectiveness of using an FRM to reduce $\Delta$.

These measurements were repeated with a 15 m long EDF to verify that a longer EDF length would produce a greater reduction in $\Delta$, as suggested by the theoretical results of FIG. 4. The results obtained with the 15-meter EDF are presented below in TABLE 2.

TABLE 1

| 6 meter EDF | $PC_{pol}$ | $PC_{pump}$ |
|---|---|---|
| HR | 40 ppm | 16 ppm |
| FRM | 10 ppm | 10 ppm |

TABLE 2

| 15 meter EDF | $PC_{pol}$ | $PC_{pump}$ |
|---|---|---|
| HR | 45 ppm | 18 ppm |
| FRM | <3.5 ppm | 22 ppm |

Consistent with the trend predicted by the theory, $\Delta$ increased from 40 to 45 ppm with the 15 m long EDF when an HR was used as the reflector 1624 and $PC_{pol}$ 1638 was adjusted. When an FRM was used as the reflector 1624 and the $PC_{pol}$ 1638 was adjusted, $\Delta$ was measured to be under 3.5 ppm (approximately the noise floor of the instrument). As for the dependence of $\Delta$ on pump polarization, it was found to increase slightly, from 18 ppm to 22 ppm, but given the noise floor of the instrument (about 3 ppm), this increase is not significant. The 15 m-EDF data show that a greater reduction in the degree of polarization of the output (down to 3.5 ppm) can be achieved by utilizing a longer EDF 1520, with only a small reduction in output power (see FIG. 5). The $PC_{pol}$ experimentally determined values are plotted in FIG. 4.

The relatively large residual $\Delta$ observed when $PC_{pump}$ 1620 is adjusted in the FRM SFS of FIG. 8 arises largely from polarization dependent loss (PDL) in the WDM coupler 1608. This PDL was measured to be 0.1 dB, i.e., the coupler transmission at the pump wavelength varied with the orientation of the linear input pump polarization by 0.1 dB. Thus, as $PC_{pump}$ 1620 was adjusted, the pump power launched into the EDF 1520 varied by 0.1 dB, or 0.75 mW. It is well known that the mean wavelength depends on pump power. For this source, it was simulated to vary by 20 ppm/mW for the 6 meter EDF SFS, and by 60 ppm/mW for the 15 meter SFS. Multiplying these quantities by 0.75 mW yields 15 ppm and 45 ppm, respectively, which supports the trends in TABLES 1 and 2. This undesirable effect can be corrected by placing a Lyot depolarizer between the WDM coupler 1608 and the EDF 1520.

While preferred embodiments of this invention have been disclosed herein, those skilled in the art will appreciate that changes and modifications may be made therein without departing from the spirit and scope of the invention as defined in the appended claims.

What is claimed is:

1. A superfluorescent source, comprising:
   an optical pump;
   a laser medium with a dopant therein, the medium being pumped by pump light from the optical pump, the medium producing amplified spontaneous emission (ASE) having first and second orthogonal polarization components, the pump light providing unequal gain to the ASE in the first and second polarization components to cause the ASE to have a spectrum that has a mean wavelength for the first orthogonal polarization component that is different than a mean wavelength for the second orthogonal polarization component, the ASE being emitted from the medium in first and second directions;

an optical coupler that optically couples the pump to the medium;

a Faraday rotator mirror that receives the ASE emitted from the medium in the first direction and that reflects the ASE back to the medium to propagate in the second direction through the medium and be emitted from the medium in the second direction, the Faraday rotator mirror rotating the polarization of each orthogonal component of the reflected ASE by 90 degrees to cause the ASE emitted from the medium in the first direction in the first polarization to propagate back through the medium in the second direction in the second polarization and to cause the ASE emitted from the medium in the first direction in the second polarization to propagate back through the medium in the second direction in the first polarization, the pump light providing unequal gains to the first and second orthogonal polarization components of the reflected ASE propagating through the medium in the second direction such that a net gain experienced by the first orthogonal polarization component of the reflected ASE emitted from medium in the second direction is approximately equal to a net gain experienced by the second orthogonal polarization component of the reflected ASE emitted from the medium in the second direction, thereby reducing the polarization dependence of the output of the source; and an output port that couples ASE emitted in the second direction from the source.

2. The source of claim 1, further comprising a depolarizer between said medium and said coupler.

3. The source of claim 1, wherein said mirror is coupled to said optical coupler.

4. The source of claim 1, wherein said mirror is coupled to said medium.

5. The source of claim 1, further comprising an optical isolator at the output port to reduce optical feedback.

6. The source of claim 1, further comprising a fiber optic gyroscope that receives output from said superfluorescent source.

7. A superfluorescent source, comprising:

a laser medium with a dopant therein that produces amplified spontaneous emission (ASE) whose spectrum has a mean wavelength that is different for different polarization components of the ASE, said medium being pumped by pump light from said optical pump, wherein said medium is polarization maintaining and the pump light is directed into said medium in such a way that equal powers of the pump light are launched along birefringence axes of said medium;

an optical coupler that optically couples said pump to said medium;

a Faraday rotator mirror that reduces the polarization dependence of the output of said source, said mirror reflecting ASE emitted from said medium back through said medium; and an output port that couples ASE from said source.

8. The source of claim 7, wherein the pump light is linearly polarized and is introduced to said medium at 45 degrees with respect to the birefringence axes of said medium.

9. The source of claim 1, wherein said dopant is erbium.

10. The source of claim 1, wherein reducing polarization dependent gain in said medium reduces the mean wavelength difference between the respective spectral outputs of orthogonal polarization components.

11. The source of claim 1, wherein reducing the polarization dependent gain reduces any dependence of the mean wavelength of any polarization component on birefringence of said medium.

12. The source of claim 1, wherein said mirror reflects unabsorbed pump light back through said medium to further reduce the polarization dependence of the output.

13. The source of claim 1, wherein said medium includes an optical fiber.

14. The source of claim 1, wherein said medium includes an optical waveguide.

15. The source of claim 1, wherein said medium is polarization maintaining and the pump light is directed into said medium in such a way that equal powers of the pump light are launched along birefringence axes of said medium.

16. The source of claim 15, wherein the pump light is linearly polarized and is introduced to said medium at 45 degrees with respect to the birefringence axes of said medium.

17. The source of claim 7, further comprising a depolarizer between said medium and said coupler.

18. The source of claim 7, wherein said mirror is coupled to said optical coupler.

19. The source of claim 7, wherein said mirror is coupled to said medium.

20. The source of claim 7, further comprising an optical isolator at the output port to reduce optical feedback.

21. The source of claim 7, further comprising a fiber optic gyroscope that receives output from said superfluorescent source.

22. The source of claim 7, wherein said dopant is erbium.

23. The source of claim 7, wherein reducing polarization dependent gain in said medium reduces the mean wavelength difference between the respective spectral outputs of orthogonal polarization components.

24. The source of claim 7, wherein reducing the polarization dependent gain reduces any dependence of the mean wavelength of any polarization component on birefringence of said medium.

25. The source of claim 7, wherein said mirror reflects unabsorbed pump light back through said medium to further reduce the polarization dependence of the output.

26. The source of claim 7, wherein said medium includes an optical fiber.

27. The source of claim 7, wherein said medium includes an optical waveguide.

* * * * *